3,017,361
"NON-SQUAWKING" AUTOMATIC
TRANSMISSION FLUID
John R. Morris, Fishkill, Raymond C. Schlicht, Wappingers Falls, Clinton W. Adams, Newburgh, and Julius A. Lawrence, Beacon, N.Y., assignors to Texaco Inc., a corporation of Delaware
No Drawing. Filed Sept. 5, 1956, Ser. No. 607,994
6 Claims. (Cl. 252—35)

This invention relates to a compounded mineral lubricating oil and, more particularly, to a hydraulic fluid adapted for use in the automatic transmissions of motor vehicles.

In the simple fluid drive or torque converter, the hydraulic fluid is required mainly to transmit torque and to function as a heat transfer medium. However, in the more complicated automatic transmissions which have, in addition to a fluid coupling or a torque converter, wet clutches, planetary gearing and hydraulic control mechanism, additional problems of adequate lubrication are also involved. Rigorous requirements have been set up to qualify a hydraulic fluid for this service. These requirements include a viscosity index of at least 132 to provide improved operation over a wider temperature range and to insure that a simple fluid can be used in all current production automatic transmissions, a flash point of 320° F. minimum, a fire point of 355° F. minimum and a pour point of —45° F. maximum to insure pumpability of the fluid at low atmospheric temperatures. In addition, the fluid must not have a detrimental effect on copper alloys as determined by its ability to pass a copper strip corrosion test; it must have no deleterious effect on the synthetic seals used in automatic transmissions; and it must have a high degree of oxidation resistance and be able to withstand prolonged heating at high temperatures without decomposition. Finally, the fluid must possess excellent anti-frictional properties involving oiliness and extreme pressure characteristics to afford proper lubrication of the gearing, clutch plates and other parts of the automatic transmissions.

As a measure of the ability of the hydraulic fluid to afford proper operation in the automatic transmission, several severe tests have been formulated. Thus, one of the requirements is that the fluid should pass the CRC L-4 oxidation test at 265° F. crankcase temperature. Another requirement is that the fluid pass a so-called non-chatter or "squawk" test, which means that the fluid functions in the automatic transmisison without objectionable chatter or "squawking." The latter is a high-pitched sound produced by a "stick-slip" phenomenon of the clutch plates, particularly in the second-third upshift. A third rigorous requirement is that the fluid should pass a so-called cycling test, which involves operation in the automatic transmission through repeated cycles of idling to full throttle at a transmission oil temperature of 275° F. over a substantial period of time, without substantial deposition of sludge or varnish formation and without injury to the clutch plates.

It has been found that a great variety of additives or inhibitors, which are generally effective in motor oil service in preventing oil oxidation and corrosion and imparting other desirable qualities, either cannot be employed for the present service because the compounded mineral lubricating oil will then not meet the requirements for viscosity, viscosity index and pour point, or are ineffective in the present service because they do not suppress the "squawk" and/or actually increase the amount of sludge formed and the amount of deposits on the clutch plates of the automatic transmission. Moreover, the requirements for additives which satisfactorily suppress the "squawking" tendency and afford suitable operation in the cycling test are quite different from those involved in ordinary crankcase lubrication or diesel motor oil service. The problem, therefore, was not that of selection of known additives for their expected results, but involved entirely new requirements in a nonanalogous field.

In accordance with the present invention, it has been discovered that oil-soluble metal salts of carboxylic acids of at least 8 carbon atoms are excellent "anti-squawk" agents. Accordingly, the hydraulic transmission fluids of this invention comprise at least 85 weight percent of a mineral lubricating oil and 0.1 to 0.4 weight percent of a soluble metal salt of a carboxylic acid of at least 8 carbon atoms. Advantageously, the carboxylic acid from which the oil-soluble metal salt is derived contains at least 12 carbon atoms. Magnesium stearate and magnesium oleate are particularly preferred "anti-squawk" agents. Additives in an amount of about 5 to 12 weight percent are usually present in the finished automatic transmission fluid to impart improved viscosity index, anticorrosive and detergent properties thereto. A foam inhibitor such as a silicone polymer also is usually included in the finished commercial product.

The mineral lubricating oil which constitutes at least 85 weight percent of the composition is a refined oil or a mixture of refined oils selected according to the viscosity requirements of the particular service. For automatic transmissions where the requirements include an SUS viscosity of the compounded oil at 210° F. of 49 to 51 minimum and at 0° F. of 7,000 maximum (extrapolated), the base oil or the major component thereof is generally a distillate oil lighter than an SAE 10 grade motor oil such as one having an SUS viscosity at 100° F. less than 150 and generally between about 50 and 125. This base oil or major component thereof can be prepared from a naphthenic distillate by acid treating. The flash point of this major component of the base oil will generally be substantially above 300° F.; if this distillate fraction constitutes the entire base oil, its flash point will usually be between 350 and 375° F. or higher.

A particularly preferred base oil composition comprises approximately 70 to 85 percent of a light distillate oil of the type described in the previous paragraph and 15 to 30 percent of a refined residual fraction which imparts improved flash and lubricating properties to the distillate fraction. A particularly preferred modifying agent is a paraffin base residuum which has been subjected to propane deasphalting and centrifuge dewaxing and which has an SUS viscosity at 210° F. below about 250, a flash in the neighborhood of 550 to 580° F. and a pour of 10 to 20° F. An effective base oil mixture comprises 77 percent of an acid-treated naphthenic base distillate having an SUS at 100° F. of 57 to 62, a flash above 300° F. minimum, a pour below —40° F. and 23 percent of a paraffin base residuum which has been subjected to propane deasphalting and centrifuge dewaxing and having an SUS viscosity at 210° F. of 198, a flash of about 570° F. and a pour of 15° F. The resulting base oil has a flash above 320° F., at pour substantially below —40° F. and an SUS viscosity at 100° F. of 115.

The oil-soluble metal carboxylates which impart improved "anti-squawk" properties to automatic transmission fluids have the following general formula:

$$(RCOO)_nX$$

wherein X is a group II, III or IV metal or the corresponding hydroxy metal group, R is a hydrocarbon radical containing at least 7 carbon atoms and $n$ is 1 to 4. Basic salts may be used, but the neutral metal salts are preferred because of their better solubility in lube oil. Alkali metal carboxylic acid salts are relatively ineffective as "squawk" inhibitors. Aliphatic carboxylic acid salts are generally employed because of their greater availability, but soluble metal salts of cycloaliphatic and aromatic carboxylic acids containing at least 8 carbon atoms can also be used as "anti-squawk" agents.

The metals which are most effective in the form of their carboxylic acid salts in "anti-squawk" properties are magnesium, cadmium, zinc, calcium, titanium and aluminum. Other groups II, III and IV metal carboxylates may be used, but the foregoing metals are particularly effective. Magnesium stearate and magnesium oleate have been found to be particularly effective "anti-squawk" agents. The following metal carboxylates are illustrative of the materials that impart improved "anti-squawk" properties to automatic transmission fluids: zinc stearate, zinc octoate, zinc oleate, magnesium laurate, magnesium octoate, stannous linoleate, cadmium laurate, cadmium stearate, calcium oleate, calcium laurate, magnesium wax oxidate, titanium stearate, aluminum stearate, cadmium o-t-butyl benzoate, aluminum oleate, titanium p-octyl benzoate and titanium laurate.

The oil-soluble carboxylates of groups II, III and IV metals must be employed in an amount within the prescribed 0.1 to 0.4 weight percent concentration range in order to be effective. If the concentration of oil-soluble metal carboxylate is above the 0.4 weight percent concentration, the oil fails in the cycling test because of excessive slippage; if it is used in less than 0.1 weight percent, it is ineffective as an "anti-squawk" agent. When the concentration of oil-soluble metal carboxylate is within the prescribed 0.1 to 0.4 weight percent range, excellent "squawk" ratings are obtained.

Viscosity index improvement of the carboxylate metal salt-containing transmission fluid is usually effected with a methacrylate ester polymer having the formula

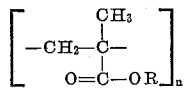

wherein R is an alkyl group or a mixture of alkyl groups containing from 4 to 20 carbon atoms, and $n$ is a number providing a molecular weight of the polymer of about 10,000 to 20,000. Various methacrylate ester polymers of this type are known which possess pour depressant and viscosity index-improving properties. A very satisfactory material of this type is a copolymer of the lower $C_4$ to $C_{14}$ alkyl methacrylate esters. A commercial methacrylate copolymer of this type, which is primarily a viscosity index improver, is sold under the trade name "Acryloid 710" by Rohm & Haas, wherein R comprises about 50 percent lauryl and 50 percent octyl groups and the molecular weight is about 10,000 to 20,000.

Another commercial material of this type is sold by the same concern under the trade name "Acryloid 150," wherein R is predominantly a mixture of 50 percent cetyl, 25 percent lauryl and 25 percent octyl groups and the molecular weight of the polymer is about 10,000 to 15,000. The latter copolymer predominates in pour depressant properties. Each of these commercial methacrylate copolymers is sold in the form of about a 40 percent concentrate of the active polymer in a light colored mineral lubricating oil base, providing a clear amber colored viscous liquid having a kinematic viscosity of 210° F. of about 600 to 850 centistokes. In the following description, the copolymer will be listed on an oil-free basis, except where the trade names of commercial products are specified.

One or more of the methacrylate ester polymers, as described above, may be employed with the base oil in a proportion of about 0.4 to 6.0 percent by weight based on the hydraulic oil composition, in order to impart the desired viscosity, viscosity index and pour point. For example, "Acryloid 710" may be employed alone with very satisfactory results with certain base oils; and, in other cases, a mixture of "Acryloid 710" and "Acryloid 150" may be used. Also it will be understood that other methacrylate ester polymers of the foregoing type can be employed.

The present hydraulic fluids also preferably include a suitable anti-foam agent, since hydraulic fluids are circulated rapidly in operation and air may be entrapped. For this purpose, a silicon polymer of high viscosity, such as dimethyl silicone polymer having a kinematic viscosity at 25° C. of about 1,000 centistokes and above, is preferably employed, since this agent also desirably increases the flash point of the fluid. The use of a high viscosity silicone polymer in a hydraulic fluid of the mineral lubricating oil type to inhibit foaming and increase the flash point is disclosed in U.S. Patent No. 2,662,055. A silicone polymer is conveniently employed in the form of a concentrate in a hydrocarbon solvent such as kerosene. For example, a very satisfactory anti-foam agent for this purpose is prepared by diluting 10 grams of a dimethyl silicone polymer (1,000 centistokes at 25° C.) with kerosene to bring the volume to 100 cubic centimeters. A proportion of the order of 0.005 to 0.025 percent by weight of the immediately foregoing concentrate is ordinarily employed, preferably sufficient to provide about 50 to 200 parts per million of the silicone polymer concentrate on the basis of the hydraulic fluid.

The detergents employed in the finished automatic transmission fluids are usually alkaline earth metal salts of petroleum sulfonates or alkaryl sulfonates, both of which are widely used in lubricants because of their detergent action. As is well known, the petroleum sulfonate divalent metal salts are formed by reaction of concentrated sulfuric acid (90 percent minimum) with a high boiling hydrocarbon fraction in the lube oil range, and subsequent neutralization of the resulting petroleum sulfonate fraction with a divalent metal carbonate or hydroxide. The alkaline earth metal salts of alkylated aromatic sulfonic acids are formed by alkylating a suitable aromatic compound such as benzene, alkyl benzene, naphthalene, alkyl naphthalene and anthracene, with an olefin in the presence of a suitable alkylation catalyst such as aluminum chloride, sulfuric acid, phosphoric acid, etc., followed by sulfonation with sulfuric acid and, finally, neutralization of the resulting aromatic sulfonic acid with a divalent metal base. Preferably, the olefin employed in this series of reactions is a high molecular weight olefin having eight or more carbon atoms such as a propylene or butylene polymer, mixed polymers or a high molecular weight straight chain olefin such as octylene, dodecylene, etc. An alternate method of preparing the alkyl aromatic starting material involves the preparation of a halogenated paraffinic hydrocarbon such as a chloro paraffin wax and subsequent alkylation of the aromatic hydrocarbon with the halogenated paraffin under conditions to liberate hydrogen halide and form a mono-, di- or tri-wax alkylated aromatic hydrocarbon which is subsequently sulfonated and neutralized. Barium, calcium, cadmium and magnesium sulfonate salts may be used as detergents, but the barium compounds are particularly effective in automatic transmission fluids.

The alkaline earth metal petroleum sulfonates are usually employed in the automatic transmission fluids of this invention. The alkaline earth metal petroleum sulfonates are generally used in the form of their basic salts because basic salts enhance the anticorrosive properties of the resulting transmission fluids in addition to functioning as detergents. Basic alkaline earth metal sulfonates is the term used to designate products resulting from reaction of petroleum sulfonic acids or alkaryl sulfonic acids with an alkaline earth metal hydroxide in such proportions that the resulting mixture contains one free hydroxyl group. "Super" basic alkaline earth metal sulfonates in which the concentration of metal is higher than calculated from the formula of the product containing one free hydroxyl group are prepared from an excess of alkaline earth metal hydroxide, petroleum sulfonic acid, a polar oxygenated hydrocarbon such as phenol and a weakly acidic organic promoter such as nitropropane. The "super" basic sulfonates are also used as detergents in automatic transmission fluids.

A particular preferred detergent used in the formulation of automatic transmission fluids characterized by excellent "anti-squawk" properties in addition to high viscosity index and anti-foam properties is a basic barium petroleum sulfonate. A superior automatic transmission fluid characterized by excellent "anti-squawk," anti-wear and anti-corrosive properties which meets the rigid requirements prescribed by the manufacturers of automatic transmissions uses basic barium petroleum sulfonate as the detergent.

The barium salts of olefin-$P_2S_5$ reaction products also possess detergent properties and are sometimes used in combination with petroleum sulfonate salts in automatic transmission fluids. A typical barium salt of this type is prepared as follows:

An olefin, for example, a $C_9$ propylene polymer, and $P_2S_5$ are reacted in the optional presence of a solvent at a temperature of 250 to 400° F. with a mol of $P_2S_5$ being used for each double bond present in the olefin; the reaction product is neutralized with barium hydroxide in a hydrocarbon solvent such as xylene under reflux conditions; the resulting barium salt is isolated from the xylene solvent. A good detergent combination comprises about 75 percent basic barium petroleum sulfonate and about 25 percent barium salt of $C_9$ propylene polymer-$P_2S_5$ reaction product.

The detergent constitutes 1 to 6 weight percent of the finished automatic transmission fluid with concentrations generally falling within the range of 2 to 5 weight percent.

The corrosion inhibitors employed in the "squawk"-free automatic transmission fluids of this invention are broadly classified as sulfur-containing organic compounds, which term includes dithiophosphate salts, sulfurized olefins, neutralized sulfurized olefins and mixtures thereof. Dithiophosphate salts are prepared by the reaction of alcohols or phenols with phosphorus pentasulfide and subsequent neutralization of the acidic reaction product with a divalent metal hydroxide or carbonate. Sulfurized olefins are obtained by the reaction of olefins including olefinic polymers and terpenes with sulfur, hydrogen sulfide or phosphorus pentasulfide; the neutral modifications result from oxidation or reaction with caustic of the foregoing reaction products.

Dithiophosphate metal salts, particularly calcium and zinc salts, are produced by the reaction of metal hydroxide, oxide, or metal, per se, with alkyl thiophosphates resulting from the reaction of monohydroxy alcohols with phosphorus pentasulfide. There appears to be some controversy over the nature of the alkyl thiophosphates resulting from the reaction of monohydroxy alcohols with phosphorus pentasulfide, but it is believed that the major reaction product has the following composition:

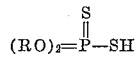

wherein R designates the radical of the alcohol used in the reaction. The salts are formed from the phosphorus pentasulfide-alcohol condensation products by reaction with an excess of powdered divalent metal, metal oxide or hydroxide at a temperature in the neighborhood of 200 to 350° F. Preferred alcohols for reaction with phosphorus pentasulfide are methyl isobutyl carbinol, isopropyl alcohol, lauryl alcohol, cyclohexanol, methyl cyclohexanol and capryl alcohol. The zinc salts of alkyl thiophosphates formed by reaction of $P_2S_5$ with one of the aforementioned alcohols have proven to be particularly excellent corrosion inhibitors in automatic transmission fluid. A lauryl alcohol-$P_2S_5$ zinc reaction product is a particularly effective corrosion inhibitor.

Sufurized olefins and the neutralized modifications thereof result from the reaction of $C_8$ to $C_{20}$ aliphatic olefins or a terpene with sulfur, hydrogen sulfide or phosphorus pentasulfide. For example, sulfurized terpenes result from the reaction of sulfur, hydrogen sulfide or phosphorus pentasulfide with compounds such as pinene, limonene, terpinene, dipentene and mixtures thereof. $C_9$ to $C_{18}$ olefinic polymers prepared by the polymerization of propylene, butylene or mixtures thereof are also used in the preparation of sulfurized olefin corrosion inhibitors. The products designated neutralized sulfurized olefins are obtained by adding a dry neutralizing agent such as potassium hydroxide, sodium hydroxide, sodium carbonate, sodium bicarbonate, calcium oxide, etc. to the sulfurized olefin, preferably at an elevated temperature of 100 to about 400° F. and preferably in a non-oxidizing atmosphere. The neutralization can also be effected by contacting the reaction product obtained by sulfur, hydrogen sulfide or phosphorus pentasulfide sulfurization with a solution of neutralizing agent, e.g., potassium hydroxide dissolved in alcohol. Neutralization can also be effected by oxidation of the sulfurization product; oxidation with 30 percent $H_2O_2$ is normally used.

A preferred sulfurized olefin is obtained by reacting a terpene mixture comprising mainly dipentene with about 10 percent $P_2S_5$. After the reaction is completed, excess phosphorus pentasulfide is separated from the reaction product by filtering or by diluting with a solvent such as hexane, filtering and distilling off the solvent. The reaction mixture may be further treated by blowing with steam or nitrogen at an elevated temperature. Neutralization of the phosphorus pentasulfide-terpene reaction product may be effected by contact of the reaction product with an alcoholic solution of potassium hydroxide. Examples of commercial products of this type are LZ-92 sold by Lubrizol Corporation and S-394-C sold by Monsanto.

The corrosion inhibitor usually constitutes between 1 and 4 weight percent of the total transmission fluid with concentrations of 1½ to 3 percent being preferred. The corrosion inhibitor is usually a divalent metal alkyl thiophosphate alone or in combination with one of the second class of corrosion inhibitors comprising sulfurized olefins and their neutralized modifications. A particularly effective corrosion inhibitor is an 85-15 mixture of zinc alkyl dithiophosphate and a terpene-$P_2S_5$ reaction product. The zinc alkyl dithiophosphate alone is also an effective corrosion inhibitor.

The following examples illustrate the effective "anti-squawk" properties of hydraulic transmission fluids containing 0.1 to 0.4 weight percent of a neutral divalent salt of an aliphatic dicarboxylic acid of at least 8 carbon atoms. The "anti-squawk" properties are demonstrated in the "squawk" test which is carried out in a 1948 Cadillac equipped with a 1947 production "Hydramatic" transmission. Alternate full and part throttle accelerations are made, with the transmission going through normal shifting. Tests are started with the bulk oil temperature below 100° F. and the oil is allowed to heat up in normal operation. Temperatures are recorded at the beginning of each acceleration and the "squawk" tendency of the transmission on the second-third upshift is noted. The test is stopped when 10 full throttle "squawks" on the second-third upshift are recorded. In the case of hydraulic fluids with which little or no "squawking" is noted, the test is continued for 75 cycles up to a bulk oil temperature of approximately 310° F. before ending the test. In rating the oils, a 0 rating is optimum, 0 to 49 is good, 50 to 149 is fair and 150 to 300 is poor; ratings over 150 fail.

In Example I, base oil containing a viscosity index improver and antifoam agent is compared in the "squawk" test with the same oil containing magnesium stearate.

*Example I*

Two hydraulic fluids were prepared from a base fluid comprising 80 percent of an acid-treated naphthene base distillate and 20 percent of a propane deasphalted centrifuged dewaxed paraffin base residuum. The distillate had an SUS viscosity at 100° F. of 57 to 62 and the residuum had an SUS viscosity at 210° F. of 198. The two fluids were approximately the same with the exception that fluid B contained 0.25 percent magnesium stearate. The compositions of the fluids in weight percent were as follows:

|  | A | B |
|---|---|---|
| Base oil | 96.00 | 95.75 |
| Acryloid 710 | 4.00 | 4.00 |
| Kerosene concentrate containing 10 g. dimethyl silicone per 100 cc. of solution, p.p.m. | 150 | 150 |
| Magnesium stearate | 0.00 | 0.25 |

The hydraulic fluid A gave a "squawk" test of 300, while fluid B containing magnesium stearate gave a "squawk" test of 0.

The tests, in addition to the "squawk" test, which have been prescribed by the makers of automatic transmissions to evaluate fluids for use therein, are the oven sludge test, the CRC–L–4 oxidation test and the cycling test, which are hereafter described before presentation of the rest of the examples.

An oven sludge test is a preliminary screening test to reject compositions which are inferior in respect to high temperature breakdown and sludging and, therefore, incapable of passing the cycling test. This sludge test is run by placing a sample of the fluid in an oven for 125 hours at 250° F., and then measuring the weight percent of sludge formed.

A CRC–L–4 oxidation test is run on the fluid at 265° F. crankcase temperature in accordance with conventional procedure. Passing this test requires a copper-lead bearing weight loss below a specified maximum, and a satisfactory CRC rating and piston rating with respect to deposits or engine cleanliness. The acceptable bearing weight loss is 0.300 gram for 2 whole bearings. The piston rating is on a numerical scale from 0 to 10, with 10 representing a perfectly clean piston and lower numbers representing progressively poorer results due to increased varnish and deposits. A piston rating of 8 or above in this test is good. The over-all CRC rating is on a basis of 100 for perfect over-all cleanliness; a value above 85 is quite satisfactory.

The cycling test is carried out in a production V–8 Oldsmobile engine of 165 H.P. mounted on a regular dynamometer test stand, and driving a dynamometer through a product "Hydramatic" transmission. The throttle setting is varied by a cam-solenoid arrangement to provide a cycle of 15 seconds at idling speed and then 45 seconds at full throttle opening. During the full throttle opening the transmission shifts through all four forward speeds and then runs at full throttle speed. Conditions for this test include an average load of 135 H.P., a top speed in fourth gear at full throttle of 3,600 r.p.m., and a transmission oil temperature of 275° F. The test is run for a period of 100 hours, or for a lesser time up until oil failure. Oil failure is defined as that point at which the transmission takes more than 10 seconds to shift into fourth gear (with new satisfactory transmission fluids, the time is usually 4.5 to 6 seconds) or when excessive slippage is noted. After termination of the test, the transmission is disassembled and the condition of the oil and transmission noted. Of particular interest is the condition of the clutch plate facings. Also, close observation of sludge and varnish formation is made.

Examples II and III show the effect of incorporating 0.1 to 0.4 weight percent of a $C_8$ or higher oil-soluble carboxylate salt of group II, III or IV metals in base oil containing viscosity index improver, detergent, corrosion inhibitor and anti-foam agent. The resulting transmission fluids are superior products which meet the exacting requirements of automobile manufacturers.

*Example II*

The hydraulic fluids were prepared with a base fluid employed in Example I. The two fluids were approximately the same with the exception that fluid B contained 0.25 percent magnesium stearate. The compositions of the fluids in weight percent were as follows:

|  | A | B |
|---|---|---|
| Base oil | 90.985 | 90.735 |
| Acryloid 710 | 4.00 | 4.00 |
| Basic barium petroleum sulfonate | 3.00 | 3.00 |
| Zinc methylcyclohexyl dithiophosphate | 1.70 | 1.70 |
| Terpene-$P_2S_5$ product | 0.30 | 0.30 |
| Magnesium stearate | 0.00 | 0.25 |
| Kerosene concentrate containing 10 g. dimethyl silicone per 100 cc. of solution | 0.015 | 0.015 |

The following tests were obtained on these two hydraulic fluids:

|  | A | B |
|---|---|---|
| Viscosity: |  |  |
| New oil: |  |  |
| SUS at 100° F. (determined) | 182 | 194. |
| SUS at 210° F. (determined) | 48.8 | 49.7. |
| Oil after cycling test: |  |  |
| SUS at 100 °F. (determined) | 167 | 178. |
| SUS at 210 °F. (determined) | 45.7 | 46.8. |
| Viscosity index: |  |  |
| Before cycling test | 137 | 136. |
| After cycling test | 120 | 123. |
| Flash point, COC, ° F |  | 320. |
| Fire point° F |  | 355. |
| Pour point° F | −55 | −55. |
| Corrosion, copper strip, 3 hrs. at 300° F |  | Pass, slight strain. |
| Detroit transmission foam test |  | Pass. |
| Heat test, 125 hrs. at 250° F |  | No Sludge. |
| CRC–L–4 test: |  |  |
| Bearing weight loss, grams |  | 0.222. |
| Piston rating |  | 9.3. |
| Total CRC rating |  | 95.3. |
| Non-chatter ("Squawk") test | Poor, 300 | Good, 19. |

| Cycling test | '51 Cadillac | '53 Oldsmobile |
|---|---|---|
| Hours to termination | 110 | 100. |
| Reason for termination | End of test | End of test. |
| Clutch plate condition after test | Fair, mild flaking. | No flaking and little wear. |

*Example III*

The following compositions were prepared using a base oil containing the naphthene base distillate and paraffin residuum used in Example II in a 77/23 ratio, respectively:

|  | A | B |
|---|---|---|
| Base oil | 91.00 | 90.80 |
| Acryloid 710 | 4.00 | 4.00 |
| Basic Barium petroleum sulfonate | 2.93 | 2.93 |
| Barium $C_{18}$ alkyl benzene sulfonate | 0.915 | 0.915 |
| Zinc methylisobutyl carbinyl dithiophosphate | 1.14 | 1.14 |
| Magnesium stearate | 0.00 | 0.20 |
| Dimethyl silicone polymer concentrate | 0.015 | 0.015 |

The following tests were obtained

|  | A | B |
|---|---|---|
| Viscosity: |  |  |
| New oil: |  |  |
| SUS at 100° F. (determined) | 203 | 205. |
| SUS at 210° F | 50.3 | 50.4. |
| Oil after cycling test: |  |  |
| SUS at 100° F. (determined) | 188 | 195. |
| SUS at 210 °F | 47.0 | 47.6. |
| Viscosity index: |  |  |
| Before cycling test | 134 | 132. |
| After cycling test | 116 | 117. |
| Flash point, ° F |  | 330. |
| Fire point, ° F |  | 355. |
| Pour point, ° F | −55 | −55. |
| Corrosion, copper strip, 3 hrs. at 300° F. |  | Negative. |
| Heat test, 125 hrs. at 250° F |  | Trace sludge pass. |
| CRC-L-4 test on undiluted fluid: |  |  |
| Bearing weight loss, grams |  | 0.072. |
| Piston rating |  | 9.8. |
| Total CRC rating |  | 98.3. |
| Non-chatter ("Squawk") test: | Poor, 300 | Good, 41. |
| Used plates. |  |  |
| Cycling test ('53 Oldsmobile): |  |  |
| Hours to termination | 97 | 100. |
| Reason for termination | Mechanical failure. | End of test. |
| Clutch plate condition after test. | Excellent, no flaking and very little wear. | Excellent, no flaking and slight wear. |

The foregoing examples show that superior "non-squawking" automatic transmission fluids are obtained by the incorporation of detergents, viscosity index improvers and corrosion inhibitors in a base oil containing the prescribed amount of oil-soluble group II, III or IV metal salts of a carboxylic acid of at least 8 carbon atoms.

In the following table, the effect on "squawk" test of adding various oil-soluble groups II, III and IV metal salts of carboxylic acids containing at least 8 carbon atoms to inhibited base fluids is shown. There is also shown the "squawk" rating of inhibited base fluids containing an alkali metal carboxylate salt.

| Product | "Squawk" test |
|---|---|
| Fluid A of Example II | Poor—300. |
| Fluid A of Example II plus 0.25% aluminum stearate. | 0. |
| Fluid A of Example II plus 0.25% cadmium stearate. | Good—38. |
| Fluid A of Example II plus 0.25% zinc oleate | Good—47. |
| Fluid A of Example II plus 0.25% lithium stearate. | Fair—114 on 1st run, poor—236 on rerun. |
| Fluid A of Example III | Poor—300. |
| Fluid A of Example III plus 0.25% titanium stearate. | Good—33. |
| Fluid A of Example III plus 0.25% stannous linoleate. | Good—30. |

The ineffectiveness of the alkali metal carboxylate salt is in sharp contrast with the excellent "anti-squawk" properties imparted to hydraulic transmission fluids by the incorporation of prescribed quantities of groups II, III and IV metal salts of carboxylic acids containing at least 8 carbon atoms.

While the foregoing examples employing certain specific compounds have been listed for purposes of illustration on a comparative basis, it is to be understood that similar "non-squawking" hydraulic fluid compositions are produced from a base oil containing an oil-soluble metal salt of a $C_8+$ carboxylic acid by substituting other compounds falling within each of the foregoing specified classes of viscosity index improvers, detergents and corrosion inhibitors as listed above. Moreover, while a dimethyl silicone polymer has been specifically enumerated as an anti-foam agent, it will be understood that other types of liquid silicone polymers, particularly the dihydrocarbon silicone polymers as disclosed in U.S. Patent No. 2,375,007, such as diethyl, methyl ethyl, diphenyl, phenyl ethyl, and methyl phenyl silicone polymers, can be employed for this purpose. Also, it will be understood that satisfactory "squawk-free" hydraulic fluids for various purposes can be prepared by utilizing detergent, "squawk" suppressor and corrosion inhibitor together with the methacrylate ester polymer, viscosity index improver and foam inhibitor within the following proportion ranges:

| | Weight percent |
|---|---|
| Oil-soluble group II, III or IV metal salt of a $C_8$ or higher carboxylic acid | 0.1 to 0.4 |
| Methacrylate ester polymer | 0.4 to 6.0 |
| Sulfonate salt detergent | 1.0 to 6.0 |
| Dithiophosphate salt, sulfurized olefin, neutralized sulfurized olefin or mixture thereof | 1.0 to 4.0 |
| Mineral lubricating oil | Balance |

This application is a continuation-in-part of our co-pending application Serial No. 422,672, filed April 12, 1954, and now abandoned.

Obviously, many modifications and variations of the invention, as hereinbefore set forth may be made without departing from the spirit and scope thereof, and, therefore, only such limitations should be imposed as are indicated in the appended claims.

We claim:

1. A method of operating an automatic transmission comprising lubricating said transmission with a fluid comprising at least 85 weight percent of a mineral lubricating oil and between 0.1 to 0.4 weight percent of an oil soluble metallic salt of an aliphatic hydrocarbyl mono carboxylic acid having at least eight carbon atoms, said metal being selected from a group consisting of metals of groups II, III and IV of the periodic table, said amount of said metallic salt being sufficient to eliminate squawking without adverse effect on the performance of the oil in the cycling test.

2. The method of claim 1 in which the oil soluble metal salt is a neutral salt of an aliphatic carboxylic acid containing at least twelve carbon atoms.

3. The method of claim 1 in which the oil soluble metal salt is magnesium stearate.

4. The method of claim 1 in which the oil soluble metal salt is aluminum stearate.

5. The method of claim 1 in which the oil soluble metal salt is cadmium stearate.

6. The method of claim 1 in which the oil soluble metal salt is titanium stearate.

References Cited in the file of this patent

UNITED STATES PATENTS

| | | |
|---|---|---|
| 1,628,646 | Becker | May 17, 1927 |
| 1,820,295 | Bennett | Aug. 25, 1931 |
| 1,837,279 | McGill | Dec. 22, 1931 |
| 2,001,108 | Parker | May 14, 1935 |
| 2,055,417 | Moser | Sept. 22, 1936 |
| 2,202,364 | Wiezevich | May 28, 1940 |
| 2,218,618 | McNab et al. | Oct. 22, 1940 |
| 2,223,127 | Prutton | Nov. 26, 1940 |
| 2,227,149 | Murphree | Dec. 31, 1940 |
| 2,231,167 | Lazar et al. | Feb. 11, 1941 |
| 2,366,817 | Towne | Jan. 9, 1945 |
| 2,451,039 | Morway et al. | Oct. 12, 1948 |
| 2,489,300 | Leyda | Nov. 29, 1949 |
| 2,504,552 | Lewis | Apr. 18, 1950 |
| 2,623,835 | Melsen | Dec. 30, 1952 |
| 2,681,891 | Bos et al. | June 22, 1954 |
| 2,710,842 | Heisig | June 14, 1955 |
| 2,768,953 | Howell | Oct. 30, 1956 |
| 2,830,956 | Wasson | Apr. 15, 1958 |
| 2,851,422 | Manteuffel | Sept. 9, 1958 |

OTHER REFERENCES

Ellis: "Lubricant Testing," Scientific Pub. (Great Britain), 1953, pages 146–150.